United States Patent
Chen et al.

(10) Patent No.: US 11,915,474 B2
(45) Date of Patent: Feb. 27, 2024

(54) REGIONAL-TO-LOCAL ATTENTION FOR VISION TRANSFORMERS

(71) Applicant: International Business Machines Corporation, Armonk, NY (US)

(72) Inventors: Richard Chen, Baldwin Place, NY (US); Rameswar Panda, Medford, MA (US); Quanfu Fan, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/804,724

(22) Filed: May 31, 2022

(65) Prior Publication Data
US 2023/0386197 A1    Nov. 30, 2023

(51) Int. Cl.
G06V 10/96    (2022.01)
G06V 10/25    (2022.01)
G06V 10/77    (2022.01)

(52) U.S. Cl.
CPC .............. *G06V 10/96* (2022.01); *G06V 10/25* (2022.01); *G06V 10/7715* (2022.01)

(58) Field of Classification Search
CPC ..... G06V 10/96; G06V 10/25; G06V 10/7715
See application file for complete search history.

(56) References Cited

U.S. PATENT DOCUMENTS

| 9,558,268 | B2 | 1/2017 | Tuzel et al. |
| 2021/0064872 | A1 | 3/2021 | Kim et al. |
| 2022/0122351 | A1* | 4/2022 | Chen .................. G06N 3/08 |

(Continued)

FOREIGN PATENT DOCUMENTS

| CN | 107610110 A | 1/2018 |
| CN | 110569905 A | 12/2019 |
| CN | 110619639 A | 12/2019 |

(Continued)

OTHER PUBLICATIONS

Grace Period Disclosure: Chen, Richard et al., "RegionVIT: Region-to-Local Attention for Vision Transformers", arXiv.org, arXiv:2106.02689v2 (cs), Computer Vision and Pattern Recognition (cs.CV), first published [v1] Jun. 4, 2021 19:57:11 UTC, last revised [v2] Dec. 16, 2021 22:16:46 UTC <retrieved from the Internet Jan. 16, 2022 18:16:47 UTC>.

(Continued)

*Primary Examiner* — Myron Wyche

(74) *Attorney, Agent, or Firm* — Patterson + Sheridan, LLP

(57) ABSTRACT

Techniques and apparatus for analyzing visual content using a visual transformer are described. An example technique includes generating a first set of tokens based on a visual content item. Each token in the first set of tokens is associated with a regional feature from a different region of a plurality of regions of the visual content item. A second set of tokens is generated based on the visual content item. Each token in the second set of tokens is associated with a local feature from one of the plurality of regions of the visual content item. At least one feature map is generated for the visual content item, based on analyzing the first set of tokens and the second set of tokens separately using a hierarchical vision transformer. At least one vision task is performed based on the at least one feature map.

20 Claims, 7 Drawing Sheets

(56) References Cited

U.S. PATENT DOCUMENTS

2022/0375205 A1* 11/2022 Zhang ............... G06V 20/70
2023/0153379 A1* 5/2023 Fayyaz ............... G06N 3/04
                                                                 382/158

FOREIGN PATENT DOCUMENTS

| CN | 112001404 A | 11/2020 |
| CN | 113065558 A | 7/2021 |
| CN | 113822232 A | 12/2021 |

OTHER PUBLICATIONS

Dosovitskiy, Alexey, "An Image is Worth 16x16 Words: Transformers for Image Recognition at Scale", arXiv.org, arXiv:2010.11929v2 (cs), Computer Vision and Pattern Recognition (cs.CV), first published [v1] Oct. 22, 2020 17:55:59 UTC, last revised [v2] Jun. 3, 2021 13:08:56 UTC <retrieved from the Internet Jan. 19, 2022 20:33:47 UTC>.

Wang, Wenhai, "Pyramid Vision Transformer: A Versatile Backbone for Dense Prediction without Convolutions", arXiv.org, arXiv:2102. 12122v2 [cs.CV], Computer Vision and Pattern Recognition (cs. CV), first published [v1] Feb. 24, 2021 08:33:55 UTC, last revised [v2] Aug. 11, 2021 12:38:21 UTC <retrieved from the Internet Jan. 19, 2022 20:50:56 UTC>.

Zhang, Pengchuan, "Multi-Scale Vision Longformer: A New Vision Transformer for High-Resolution Image Encoding", arXiv.org, arXiv:2103.15358v2 [cs.CV], Computer Vision and Pattern Recognition (cs.CV), first published [v1] Mar. 29, 2021 06:23:20 UTC, last revised [v2] May 27, 2021 09:02:00 UTC <retrieved from the Internet Jan. 19, 2022 21:04:43 UTC>.

Chu, Xiangxiang, "Twins: Revisiting the Design of Spatial Attention in Vision Transformers", arXiv.org, arXiv:2104.13840v4, Computer Vision and Pattern Recognition (cs.CV), first published v1] Apr. 28, 2021 15:42:31 UTC, last revised [v4] Sep. 30, 2021 02:16:36 UTC <retrieved from the Internet Jan. 19, 2022 21:11:57 UTC>.

Cao, Yue, "Swin Transformer: Hierarchical Vision Transformer using Shifted Windows", arXiv.org, arXiv:2103.14030v2, Computer Vision and Pattern Recognition (cs.CV); Machine Learning (cs.LG), first published [v1] Mar. 25, 2021 17:59:31 UTC, last revised [v2] Aug. 17, 2021 16:41:34 UTC <retrieved from the Internet Jan. 19, 2022 21:11:57 UTC>.

\* cited by examiner

REGIONAL-TO-LOCAL ATTENTION FOR VISION TRANSFORMERS

STATEMENT REGARDING PRIOR DISCLOSURES BY THE INVENTOR OR A JOINT INVENTOR

The following disclosure is submitted under 35 U.S.C. 102(b)(1)(A): CHEN, Richard et al., "RegionViT: Region-to-Local Attention for Vision Transformers", arXiv.org, arXiv:2106.02689v2 (cs), Computer Vision and Pattern Recognition (cs.CV), first published [v1] 2021-06-04 19:57:11 UTC, last revised [v2] 2021-12-16 22:16:46 UTC.

BACKGROUND

The present disclosure relates to image and video processing technology, and more specifically, to techniques for processing images/video using a vision transformer.

A transformer is a deep learning model that adopts the mechanism of self-attention, differentially weighting the significance of each part of the input data. Self-attention is a machine learning (ML) technique that relates different positions of a single input sequence in order to compute a representation of the sequence. Transformers have been traditionally applied to natural language processing (NLP) tasks. In the NLP domain, the transformer generally measures the relationships between pairs of input tokens (e.g., words in the case of text strings). Recently, however, there has been increasing focus on using transformers for a variety of computer-vision tasks, such as image classification. Such transformers used for computer-vision tasks are generally referred to as "vision transformers."

SUMMARY

One embodiment presented herein includes a computer-implemented method. The computer-implemented method includes generating a first set of tokens based on a visual content item. Each token in the first set of tokens is associated with a regional feature from a different region of a plurality of regions of the visual content item. The computer-implemented method also includes generating a second set of tokens based on the visual content item. Each token in the second set of tokens is associated with a local feature from one of the plurality of regions of the visual content item. The computer-implemented method further includes generating at least one feature map for the visual content item, based on analyzing the first set of tokens and the second set of tokens separately using a hierarchical vision transformer. The computer-implemented method further includes performing at least one vision task based on the at least one feature map.

Another embodiment presented herein includes a system. The system includes one or more computer processors and a memory containing a program, which when executed by the one or more computer processors performs an operation. The operation includes generating a first set of tokens based on a visual content item. Each token in the first set of tokens is associated with a regional feature from a different region of a plurality of regions of the visual content item. The operation also includes generating a second set of tokens based on the visual content item. Each token in the second set of tokens is associated with a local feature from one of the plurality of regions of the visual content item. The operation further includes generating at least one feature map for the visual content item, based on analyzing the first set of tokens and the second set of tokens separately using a hierarchical vision transformer. The operation further includes performing at least one vision task based on the at least one feature map.

Another embodiment presented herein includes a computer-readable storage medium. The computer-readable storage medium has computer-readable program code embodied therewith. The computer-readable program code is executable by one or more computer processors to perform an operation. The operation includes generating a first set of tokens based on a visual content item. Each token in the first set of tokens is associated with a regional feature from a different region of a plurality of regions of the visual content item. The operation also includes generating a second set of tokens based on the visual content item. Each token in the second set of tokens is associated with a local feature from one of the plurality of regions of the visual content item. The operation further includes generating at least one feature map for the visual content item, based on analyzing the first set of tokens and the second set of tokens separately using a hierarchical vision transformer. The operation further includes performing at least one vision task based on the at least one feature map.

DETAILED DESCRIPTION

Figure 1A:
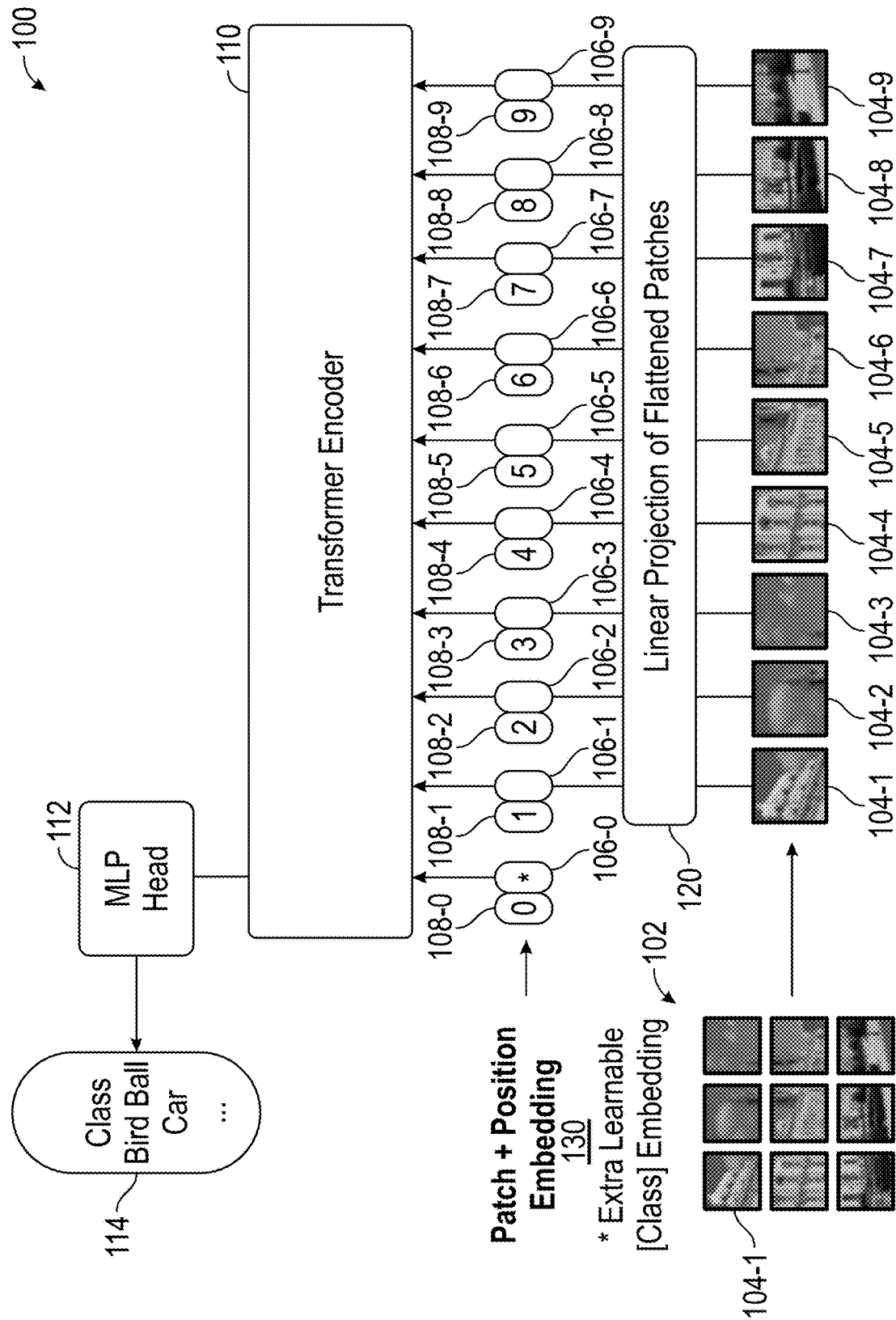
FIG. 1A illustrates an example vision transformer architecture.

Conventional vision transformer (ViT) architectures are generally based on transformer architectures used for NLP tasks. For example, a conventional transformer architecture may follow a similar NLP process for an image that involves splitting the image into patch tokens (each including a number of pixels of the image) and adding an extra class token to form an input sequence. The input sequence (including all the tokens) are then passed through one or more stacked transformer encoders. FIG. 1A illustrates an example architecture 100 for a conventional vision transformer architecture. Here, an image 102 is split into multiple fixed-size patches 104 1-9. The fixed size patches 104 1-9 are linearly embedded using a linear projection 120. The output of the linear projection 120 is generally referred to as patch embeddings 106. Position embeddings 108 are then added to the patch embeddings 106, forming a sequence of embedding vectors 130 that serve as input into a transformer encoder 110. The position embeddings 108 may be added to the patch embeddings 106 to retain positional information. A classification head 114 is attached to the output of the transformer encoder 110. The classification head 114 is implemented by a multi-layer perceptron (MLP) 112.

Figure 1B:
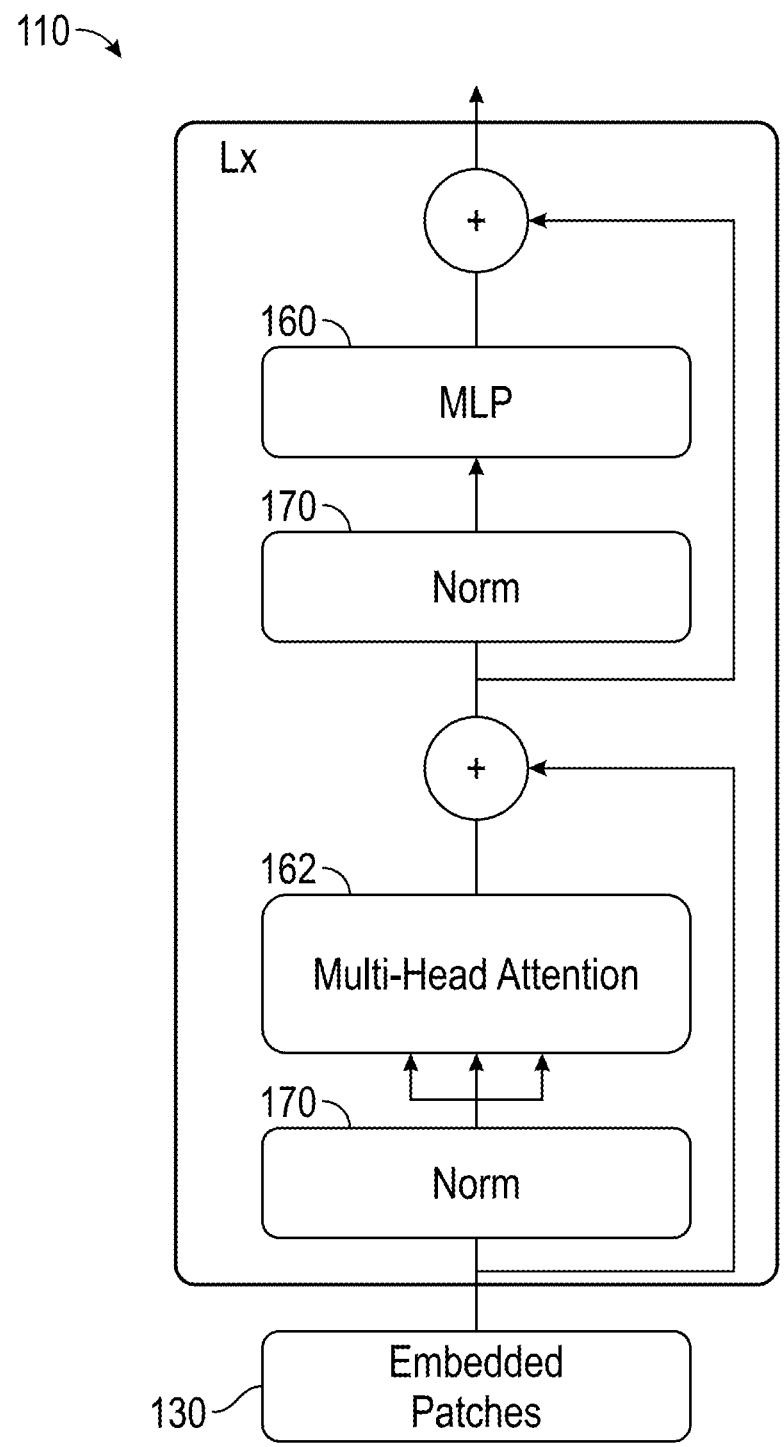
FIG. 1B illustrates an example transformer encoder of the vision transformer architecture illustrated in FIG. 1A.

An example architecture of transformer encoder 110 is illustrated in FIG. 1B. In this example, the transformer encoder 110 includes a layer of multiheaded self-attention (MSA) 162 followed by a layer of MLP 160. A layer norm 170 is applied before MSA 162, to the residual connections after MSA 162, before MLP 160, and to the residual connections after MLP 160. The ViT architecture 100 can be expressed using the following Equations (1)-(3):

$$x_0 = [x_{cls} \| x_{patch}] + x_{pos} \quad (1)$$

$$y_k = x_{k-1} + \text{MSA}(\text{LN}(x_{k-1})) \quad (2)$$

$$x_k = y_k + \text{FFN}(\text{LN}(y_k)) \quad (3)$$

where $x_{cls} \in R^{1 \times C}$ and $x_{patch} \in R^{N \times C}$ are the class token and patch tokens, respectively, and $x_{pos} \in R^{(1+N) \times C}$ is the position embedding. FFN is a feedforward network with layer normalization (LN) and residual shortcut. k, N, and C are the layer index, the number of patch tokens, and dimension of the embedding, respectively.

One technical issue with conventional ViT architectures, such as the ViT architecture 100 illustrated in FIGS. 1A-1B, is that these architectures may not be optimized for vision applications. For example, conventional ViT architectures (which are NLP-based) generally have an isotropic network structure with a fixed number of tokens and unchanged embedding size. Such an isotropic network structure may lose the capability to model the context of the tokens with different scales and may allocate computations at different scales. Consequently, use of isotropic structures typically limits the capability of extending the conventional ViT architecture to many vision applications involving high-resolution details, e.g., object detection.

Another technical issue with conventional ViT architectures is that these architectures generally use a self-attention module that has a quadratic cost in memory and computation with regard to the input sequence length (e.g., the number of tokens). The computationally-intensive and memory-intensive self-attention can make it challenging to train ViT models at fine grained patch sizes. Additionally, the computationally-intensive and memory-intensive self-attention can significantly undermine the applications of these models to computer vision tasks, such as object detection and semantic segmentation, which generally benefit from or involve fine feature information computed from high resolution images.

To address the above, embodiments described herein provide an improved ViT architecture for visions tasks, such as image classification, object detection, and action recognition. Embodiments described herein can be applied to visual content, including, for example, images, video content, etc. In one embodiment described herein, a ViT architecture uses a pyramid network structure (e.g., as opposed to an isotropic network structure) and employs a regional-to-local attention (e.g., as opposed to a global self-attention). For example, the ViT architecture may use a pyramid network structure similar to that of a convolutional neural network (CNN) structure. With such a pyramid network structure, the ViT architecture generates regional tokens and local tokens from an image with different patch sizes, where each regional token is associated with a set of local tokens based on the spatial location.

In one embodiment, the regional-to-local attention described herein involves two steps: (1) first, the regional self-attention extracts global information among all regional tokens and (2) second, the local self-attention exchanges, for each regional token, the information among the regional token and the associated local tokens. Performing attention in this manner allows the local self-attention to confine its scope in a local region while still receiving global information.

Note that, in various embodiments of the present disclosure, visual tasks (e.g., processing images for action recognition, objection detection, semantic/instance segmentation, image classification, and the like) are used as examples to explain the functionality of the ViT architecture described herein. However, embodiments of the present disclosure are readily applicable to other domains, using any input (e.g., video processing). Also, as used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Figure 2:
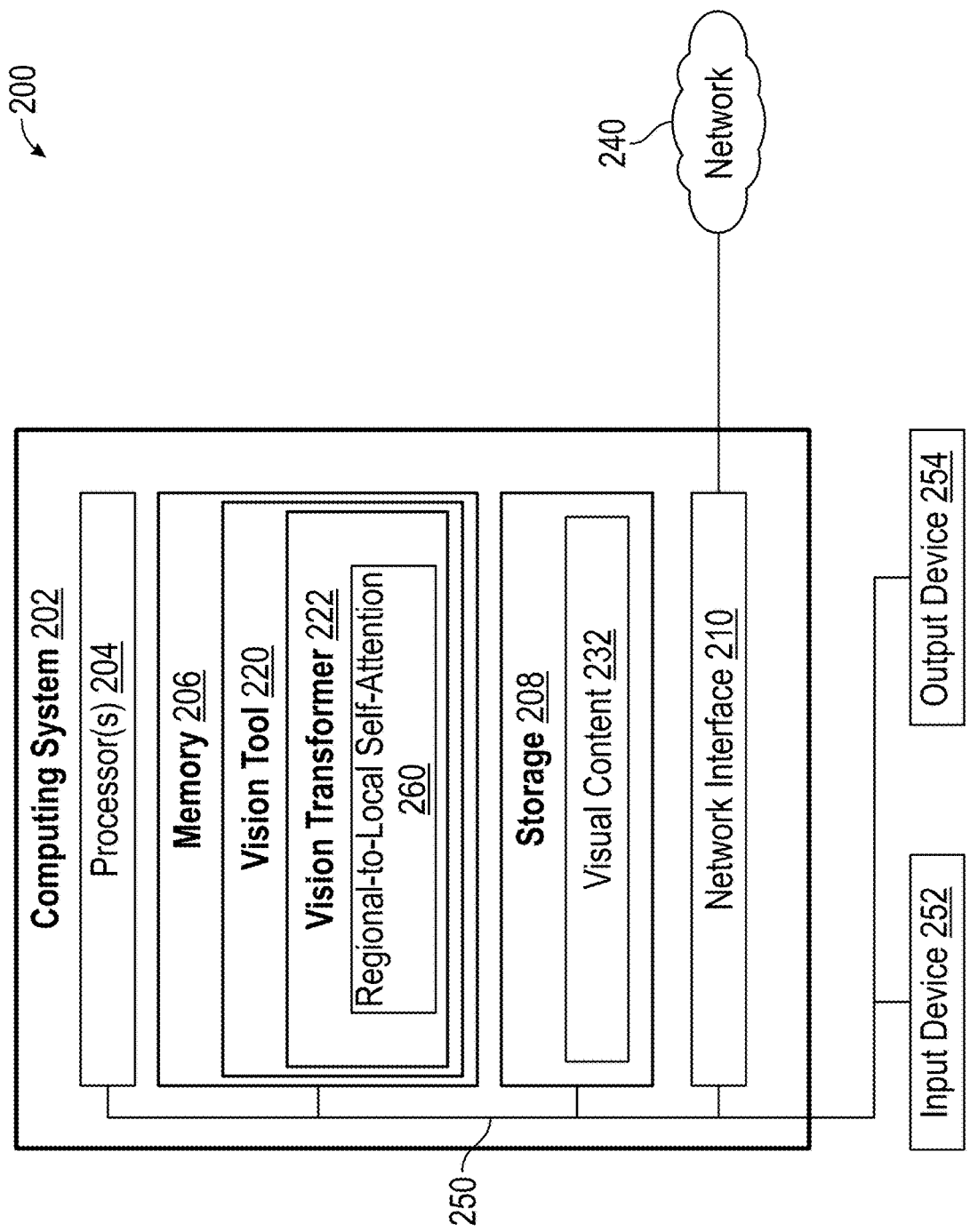
FIG. 2 is a block diagram illustrating a networked system for processing visual content using a vision transformer, according to one embodiment.

FIG. 2 is a block diagram illustrating a networked system 200 for processing visual content (e.g., images/video) using a ViT, according to one embodiment. The system 200 includes a computing system 202. The computing system 202 may also be connected to other computers via a network 240. Network 240 may include one or more networks of various types, including a local area or local area network (LAN), a general wide area network (WAN), a telecommunications or cellular network, and/or a public network (e.g., the Internet).

The computing system 202 generally includes one or more processors 204 connected via a bus 250 to a memory 206, a storage 208, a network interface 210, an input device 252, and an output device 254. The computing system 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor(s) 204 is included to be representative of a single CPU, multiple CPUs, a single CPU having multiple processing cores, and the like.

The memory 206 may include a variety of computer readable media selected for performance or other capabilities: volatile and/or non-volatile media, removable and/or non-removable media, etc. The memory 206 may include a cache, a random access memory (RAM), etc. The storage 208 may be a disk drive or flash storage device. Although shown as a single unit, the storage 208 may be a combination of fixed and/or removable storage devices, such as fixed disc drives, solid state drives, removable memory cards, optical storage, network attached storage (NAS), or a storage area-network (SAN). The network interface 210 may be any type of network communications device allowing the computing system 202 to communicate with other computing systems or devices via the network 240.

The input device 252 provides input to the computing system 202. For example, a keyboard and/or a mouse may be used. The output device 254 may be any device for providing output to a user of the computing system 202. For example, the output device 254 may be any conventional display screen. Although shown separately from the input device 252, the output device 254 and input device 252 may be combined. For example, a display screen with an integrated touch-screen may be used.

Here, the storage 208 includes visual content 232, which may include one or more images, one or more videos, or combinations thereof. The memory 206 includes a vision tool 220, which is configured to implement one or more of the techniques described herein for processing visual content (e.g., images and/or videos). The vision tool 220 includes vision transformer 222, which can include hardware, software, or combinations thereof. The vision transformer 222 includes a regional-to-local self attention component 260 (hereinafter R2L attention component 260), which uses a coarse-to-fine mechanism to compute self-attention in a hierarchical way.

In an exemplary embodiment, the vision transformer 222 divides an input image (within visual content 232) into a group of non-overlapping patches of large size (e.g., 28×28), on which regional tokens are computed via linear projection. Similarly, the vision transformer 222 generates local tokens for each region using a smaller patch size (e.g., 4×4). The vision transformer 222 then processes the regional and local tokens separately. To enable communication between the two types of tokens, the vision transformer 222 (via the R2L attention component 260) performs self-attention on the regional tokens (e.g., regional attention) and then jointly attends to the local tokens of each region including their associated regional token (e.g., local attention). By performing attention in this manner, the vision transformer 222 allows for the regional tokens to pass global contextual information to the local tokens efficiently while being able to learn from the local tokens themselves.

Embodiments therefore provide a technical solution to the technical problems of increased overhead (due to the large number of tokens) associated with conventional vision transformers and inaccuracies associated with using solely local attention (with no interaction between regions). Additionally, embodiments can significantly reduce memory complexity compared to conventional self-attention. For example, embodiments can provide savings in memory complexity by approximately $O(N/M^2)$, where M is the window size of a region and N is the total number of tokens.

Figure 3:
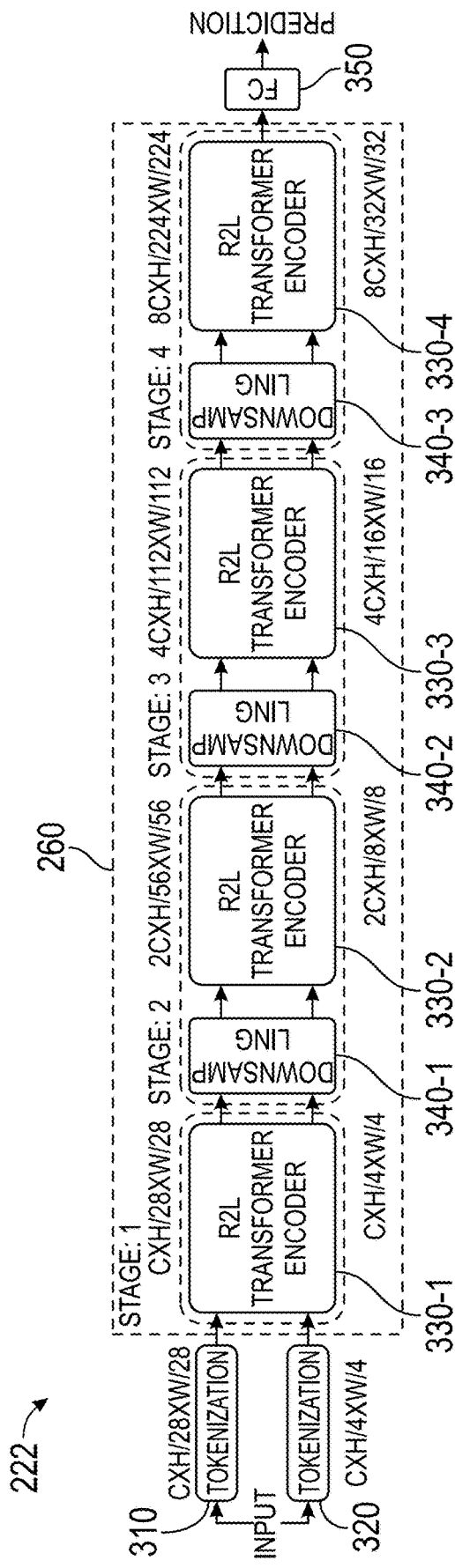
FIG. 3 illustrates an improved vision transformer architecture, according to one embodiment.

FIG. 3 illustrates an architecture of the vision transformer 222, described in FIG. 1, according to one embodiment. In the depicted embodiment, the vision transformer 222 includes two tokenization processes 310, 320 and the R2L attention component 260. The tokenization process 310 is configured to convert input visual content (e.g., an input image/video) into regional tokens, and the tokenization process 320 is configured to convert the input visual content into local tokens. In one embodiment, each tokenization process 310, 320 is a convolution with different patch sizes. For example, in the depicted embodiment, the patch size of the regional tokens generated via tokenization process 310 is $28^2$ and the patch size of the local tokens generated via tokenization process 320 is $4^2$. For both tokenization processes 310, 320, the dimensions are projected to C, which means that, in this example, one regional token may cover $7^2$ local tokens based on the spatial locality, leading to the window size of a local region to $7^2$.

The R2L attention component 260 includes multiple stages 1-4 of R2L attention. Although 4 stages are depicted in FIG. 3, note that the R2L attention component 260 can include any number of stages. Each stage includes an R2L transformer encoder 330, which is described in more detail below. Note that although each stage is depicted as having a single R2L transformer encoder 330, each stage may have any number of R2L transformer encoders 330.

For the initial stage (e.g., stage 1), the regional tokens from tokenization process 310 and the local tokens from tokenization process 320 are passed through the R2L transformer encoder 330 without a downsampling process. For later stages (e.g., stages 2-4), a downsampling process 340 is deployed to halve the spatial resolution while doubling the channel dimension on both the regional and local tokens before the subsequent stage. The downsampling process may be used to balance the computational load and to allow for feature maps at different resolutions. In the particular embodiment depicted in FIG. 3, the downsampling is a 3×3 depthwise convolution, which halves the spatial resolution and doubles the number of channels. The regional tokes take patch of $28^2$, local tokens take a patch of $4^2$, and local window size is $7^2$.

At the output of the last stage, the remaining regional tokens are averaged and uses as the final embedding for the classification 350, while the detection uses all local tokens at each stage. By using a pyramid structure for the vision transformer 222, the vision transformer 222 can generate multi-scale features allowing it to be extended to a variety of vision applications, including, for example, object detection, image classification, etc.

Figure 4:
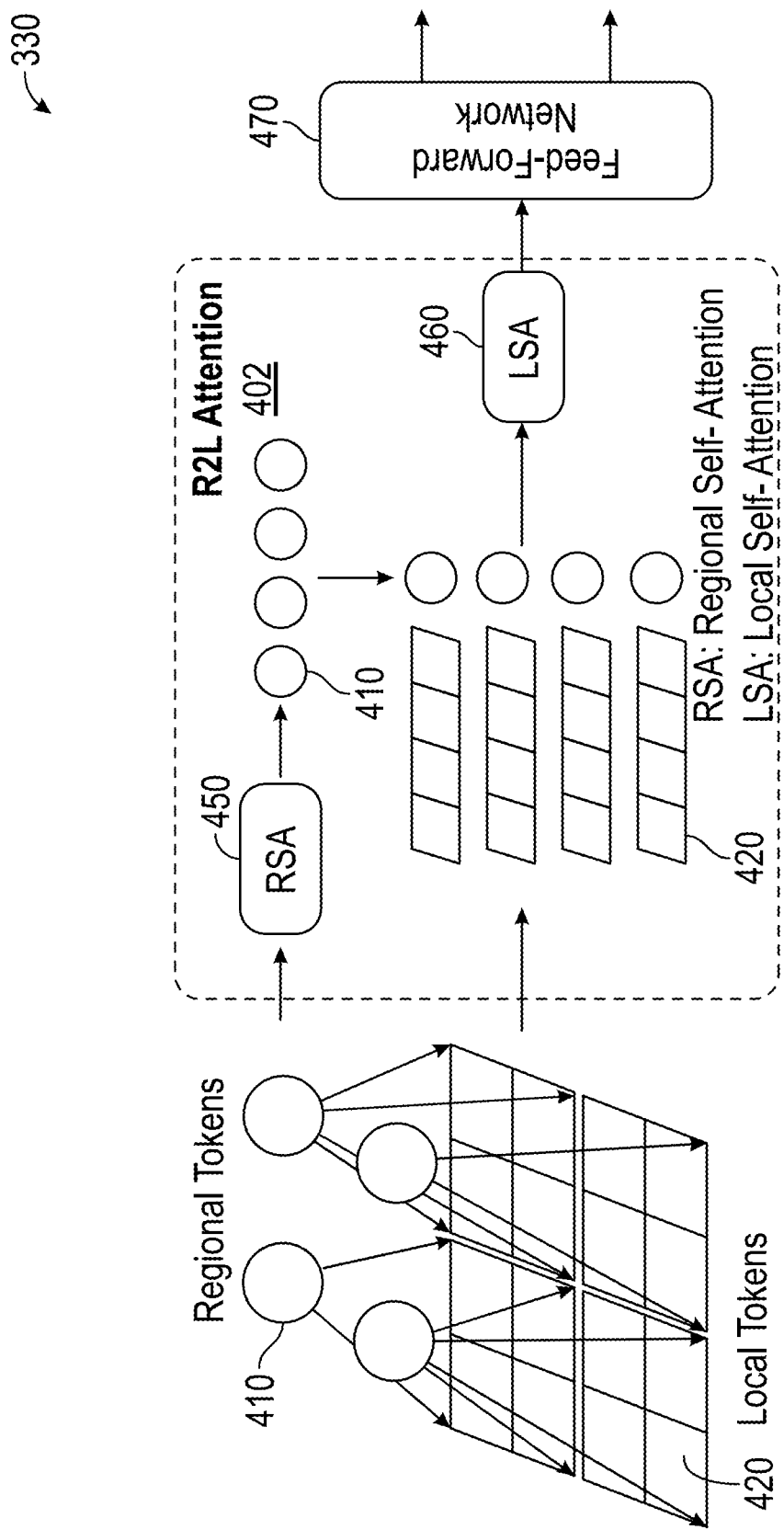
FIG. 4 further illustrates components of the improved vision transformer architecture illustrated in FIG. 3, according to one embodiment.

FIG. 4 further illustrates components of the R2L transformer encoder 330, described in FIG. 3, according to one embodiment. The R2L transformer encoder 330 includes R2L attention 402 and a feed-forward network (FFN) 470. The R2L attention 402 includes a regional self-attention (RSA) 450 and a local self-attention (LSA) 460. Both RSA 450 and LSA 460 are MSA, but with different input tokens.

Here, the regional tokens 410 are passed through RSA 450 to exchange the information among regions and then LSA 460 performs parallel self-attention where each self-attention takes one regional token 410 and corresponding local tokens 420. The LSA 460 is configured to learn the local features from the local tokens 420 while also retaining global information (from the corresponding global token 410). Stated differently, the RSA 450 exchanges information among all regional tokens 410, which cover the context of the while visual content 232, while the LSA 460 combines the features among the tokens belonging to the spatial region, including both regional and local tokens 410, 420, respectively.

In certain embodiments, since the regions are divided by non-overlapped windows, the RSA 450 is designed to exchange the information among regions where the LSA 460 takes one regional token and then combines it with the local tokens 420 in the same region. In such embodiments, the local tokens 420 may be able to obtain global information while also being focus on local neighbors. Note that, in some embodiments, the RSA 450 and LSA 460 may share the same weights, except for layer normalization (e.g., to avoid a significant increase in the number of parameters of the vision transformer).

In some embodiments, a relative position bias may also be introduced into the R2L attention 402. Note a relative position may be distinct from adding absolute position embeddings as is typically done in conventional vision transformers. A relative position bias may be used (as opposed to an absolute position) since relative position between patches (or pixels) may be more important than absolution position as the objects in the images can be places in an arbitrary way. In some embodiments, the bias is added to the attention between local tokens 420, and not to the attention between regional token and local token. Given a pair of local tokens at the location, $(x_m, y_m)$, $(x_n, y_n)$, the attention value a can be expressed using the following Equation (4):

$$a_{(x_m,y_m),(x_n,y_n)} = \text{softmax}(q_{(x_m,y_m)} k_{(x_n,y_n)}^T + b_{(x_m-x_n,y_m-y_n)}) \quad (4)$$

where $b_{(x_m-x_n,y_m-y_n)}$ is taken from a learnable parameter $B \in \mathbb{R}^{2M-1 \times 2M-1}$, where M is the window size of a region. The first term $q_{(x_m,y_m)} k_{(x_n,y_n)}^T$ is the attention value based on the content of the location tokens at the location.

By performing the two attentions described herein, the R2L attention 402 can efficiently exchange the information among all regional tokens 410 and local tokens 420. For example, the self-attention on the regional tokens 410 can extract high-level information and also act as a bridge to pass information of local tokens 420 from one region to other regions. Additionally, the R2L attention 402 can focus on local contextual information with one regional token 410.

As shown in FIG. 4, the FFN 470 is then applied to the output of the LSA 460. In some embodiments, a LN and residual shortcut may also be added. In some embodiments, given the regional and local tokens, $x_r$ and $x_l$, the R2L transformer encoder 330 can be expressed using the following Equations (5)-(8):

$$y_r^l = x_r^{l-1} + \text{RSA}(\text{LN}(x_r^{l-1})) \quad (5)$$

$$y_{i,j}^l = [y_{r_{i,j}}^l \| \{x_{l_{i,j,m,n}}^{l-1}\}_{m,n \in M}] \quad (6)$$

$$z_{i,j}^l = y_{i,j}^l + \text{LSA}(\text{LN}(y_{i,j}^l)) \quad (7)$$

$$x_{i,j}^l = z_{i,j}^l + \text{FFN}(\text{LN}(z_{i,j}^l)) \quad (8)$$

where l is the layer index, i,j are the spatial index with respect to the regional tokens 410, and m,n are the index of the local token 420 in the window size $M^2$.

As noted, the R2L transformer encoder 330 can significantly reduce memory complexity associated with vision transformers, compared to conventional vision transformers. For example, assuming memory complexity of self-attention usually consumes $O(N^2)$, where N is the number of local tokens, when a region contains $M^2$ tokens and there are $N/(M^2)$ regions, the memory complexity is generally $O(N \times M^2)$. In this example, the complexity from the attention on regional tokens may be $O((n_1/(M^2))^2)$, meaning that the overall complexity may become $O(NM^2+(N/M^2)^2)$. In an exemplary case with N=196 and M=7, the memory savings associated with the embodiments described herein may be approximately 73%.

Figure 5:
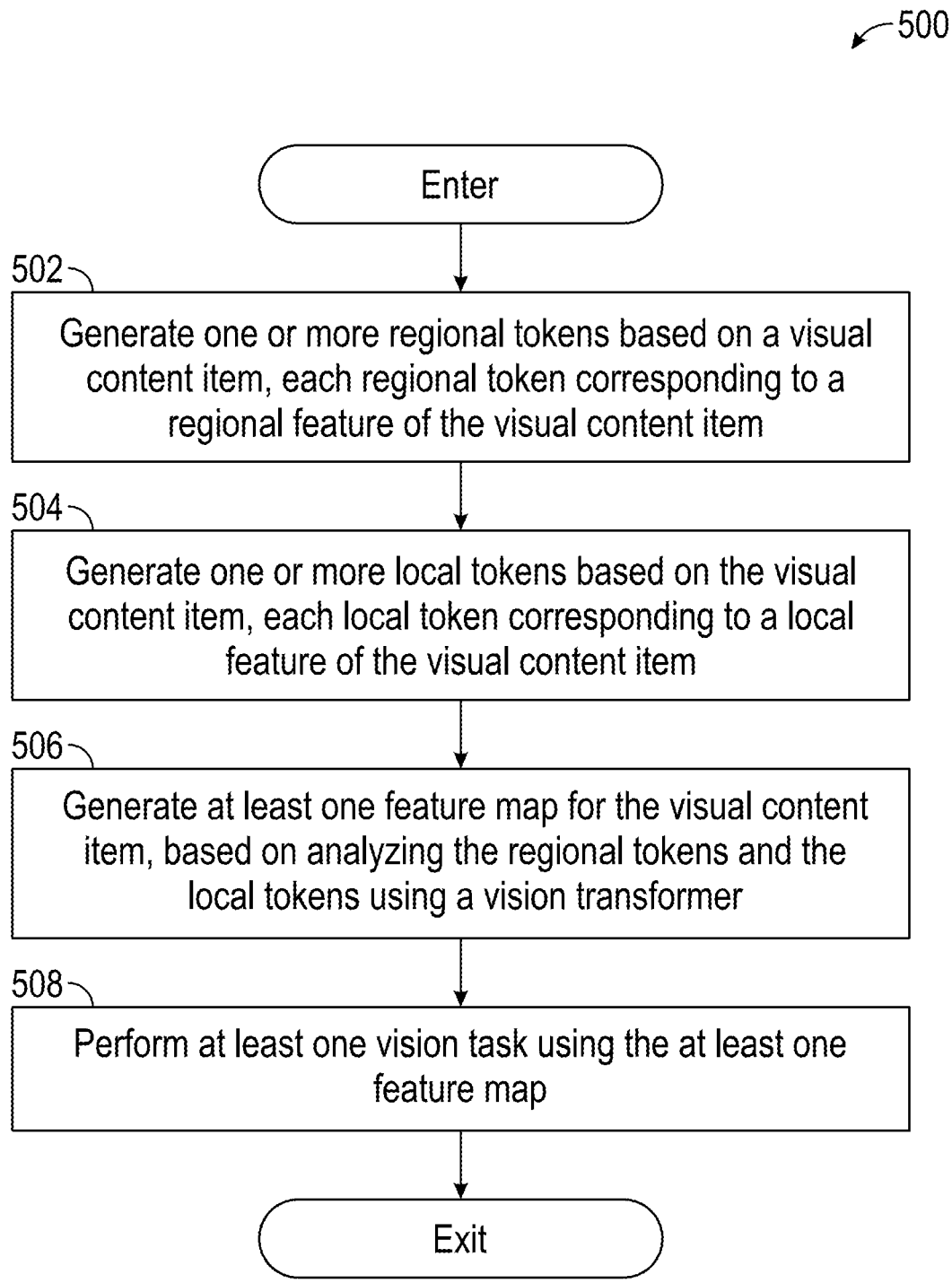
FIG. 5 is a flowchart of a method for analyzing visual content using a vision transformer, according to one embodiment.

FIG. 5 is a flowchart of a method 500 for processing visual content using a vision transformer, according to one embodiment. The method 500 may be performed by one or more components of a vision tool (e.g., vision tool 220).

Method 500 enters at block 502, where the vision tool generates one or more regional tokens based on a visual content item (e.g., visual content 232). The visual content item may be an image or a video. The regional tokens may correspond to one or more global features of the visual content item. In one embodiment, the regional tokens may be generated using a first tokenization process (e.g., tokenization process 310) of a vision transformer (e.g., vision transformer 222).

At block 504, the vision tool generates one or more local tokens based on the visual content item. The local tokens may correspond to one or more local features of the visual content item. In one embodiment, the local tokens may be generated using a second tokenization process (e.g., tokenization process 320) of the vision transformer.

At block 506, the vision tool generates at least one feature map for the visual content item, based on analyzing the regional tokens and the local tokens using the vision transformer. In one embodiment, the at least one feature map may include all features of the visual content. In one embodiment, the at least one feature map may include a larger number of features than a sum of the local features and global features from the visual content item. In one embodiment, the vision tool may implement the operations in block 506 using a regional-to-local self-attention (e.g., R2L attention 260).

At block 508, the vision tool performs at least one vision task using the at least one feature map. The at least one vision task can include at least one of: (i) image classification, (ii) object detection, (iii) action recognition, or (iv) semantic/instance segmentation. The method 500 may then exit.

Figure 6:
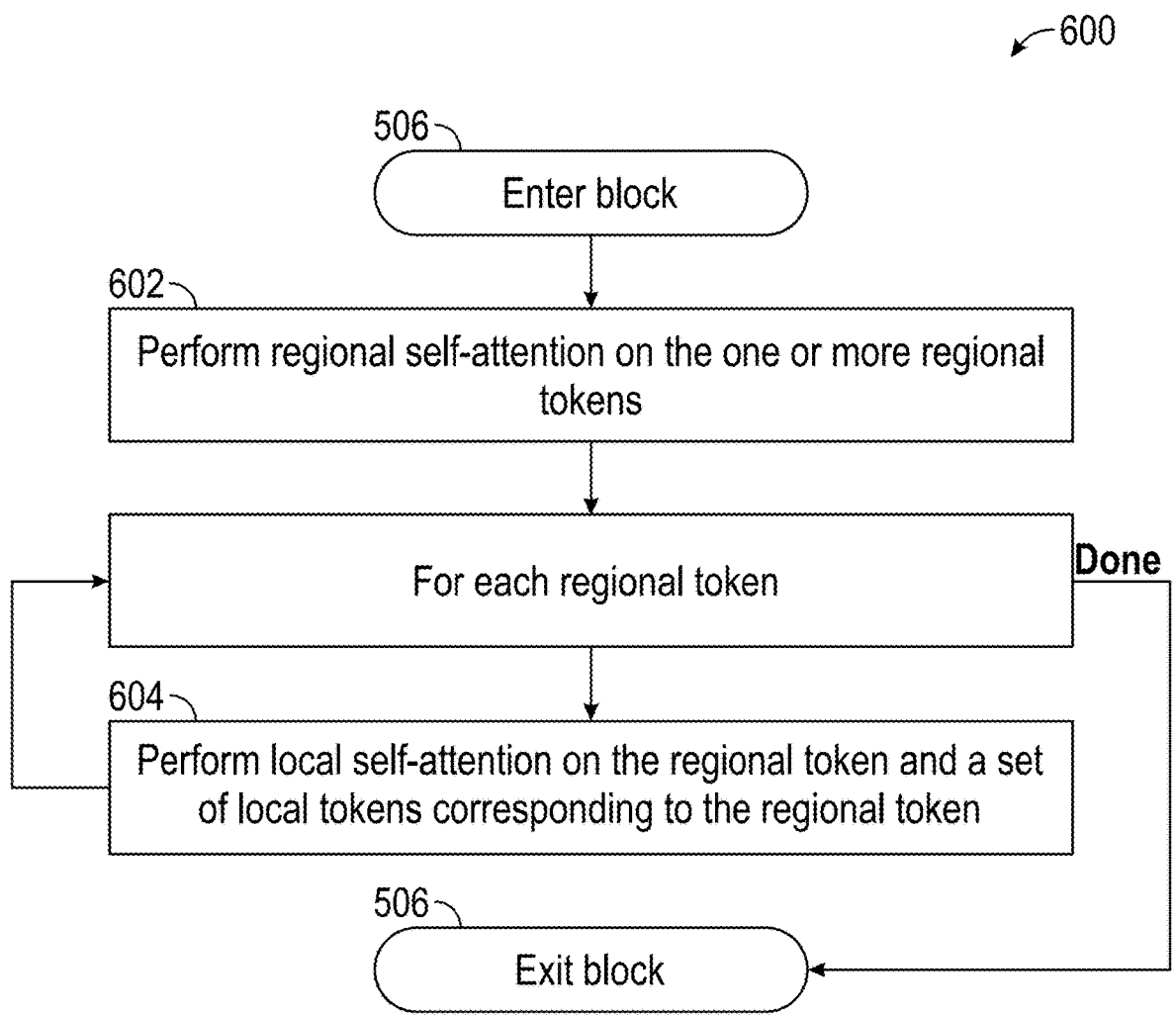
FIG. 6 is a flowchart of a method for performing regional-to-local self-attention, according to one embodiment.

FIG. 6 is a flowchart of a method 600 for performing regional-to-local self attention, according to one embodiment. The method 600 may be performed by one or more components of a vision tool (e.g., vision tool 220). In one embodiment, the method 600 may be performed as part of the operations of block 506 of method 500 illustrated in FIG. 5.

Method 600 may enter at block 602, where the vision tool performs regional self-attention (e.g., RSA 450) on one or more regional tokens (e.g., regional tokens 410). Block 604 may be performed for each regional token. At block 604, the vision tool performs local self-attention on the regional token and a set of local tokens corresponding to the regional token. Method 600 may then exit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., vision tool 220) or related data available in the cloud. For example, the vision tool 220 could execute on a computing system in the cloud and could process visual content 232 to determine a set of image features for various vision applications, including object detection, semantic segmentation, action recognition, etc. In such a case, the vision tool 220 could store the predicted image features at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    generating a first set of tokens based on a visual content item, wherein each token in the first set of tokens is associated with a regional feature from a different region of a plurality of regions of the visual content item;
    generating a second set of tokens based on the visual content item, wherein each token in the second set of tokens is associated with a local feature from one of the plurality of regions of the visual content item;
    generating at least one feature map for the visual content item, based on analyzing the first set of tokens and the second set of tokens separately using a hierarchical vision transformer; and
    performing at least one vision task based on the at least one feature map.

2. The computer-implemented method of claim 1, wherein:
    each of the first set of tokens has a first patch size;
    each of the second set of tokens has a second patch size; and
    the first patch size is greater than the second patch size.

3. The computer-implemented method of claim 1, wherein each token in the first set of tokens comprises a different plurality of tokens from the second set of tokens.

4. The computer-implemented method of claim 3, wherein the second set of tokens are distributed among the first set of tokens in a non-overlapping manner.

5. The computer-implemented method of claim 1, wherein analyzing the first set of tokens and the second set of tokens comprises:
    performing a regional self-attention on the first set of tokens; and
    for each token in the first set of tokens, performing a local self-attention on (i) the token in the first set of tokens and (ii) a plurality of tokens, from the second set of tokens, associated with the token in the first set of tokens.

6. The computer-implemented method of claim 5, wherein the local self-attention is performed after the regional self-attention on the first set of tokens.

7. The computer-implemented method of claim 5, wherein the local self-attention is performed in parallel for each token in the first set of tokens.

8. The computer-implemented method of claim 1, wherein analyzing the first set of tokens and the second set of tokens comprises performing a plurality of stages of regional-to-local self attention.

9. The computer-implemented method of claim 8, wherein, for at least a first stage of the plurality of stages, the respective regional-to-local self attention comprises performing a downsampling operation to (i) reduce a spatial resolution of the first set of tokens and the second set of tokens prior to a subsequent second stage of the plurality of stages and (ii) increase a channel dimension on the first set of tokens and the second set of tokens prior to the subsequent second stage.

10. The computer-implemented method of claim 1, wherein the at least one vision task comprises at least one of: (i) object detection, (ii) image classification, (iii) action recognition, or (iv) semantic segmentation.

11. The computer-implemented method of claim 1, wherein the visual content item comprises an image or a video.

12. A system, comprising:
    one or more computer processors; and
    a memory containing a program, which when executed by the one or more computer processors performs an operation, the operation comprising:
        generating a first set of tokens based on a visual content item, wherein each token in the first set of tokens is associated with a regional feature from a different region of a plurality of regions of the visual content item;
        generating a second set of tokens based on the visual content item, wherein each token in the second set of tokens is associated with a local feature from one of the plurality of regions of the visual content item;
        generating at least one feature map for the visual content item, based on analyzing the first set of tokens and the second set of tokens separately using a hierarchical vision transformer; and
        performing at least one vision task based on the at least one feature map.

13. The system of claim 12, wherein:
    each of the first set of tokens has a first patch size;
    each of the second set of tokens has a second patch size; and
    the first patch size is greater than the second patch size.

14. The system of claim 12, wherein each token in the first set of tokens comprises a different plurality of tokens from the second set of tokens.

15. The system of claim 12, wherein analyzing the first set of tokens and the second set of tokens comprises:
    performing a regional self-attention on the first set of tokens; and
    for each token in the first set of tokens, performing a local self-attention on (i) the token in the first set of tokens and (ii) a plurality of tokens, from the second set of tokens, associated with the token in the first set of tokens.

16. The system of claim 15, wherein the local self-attention is performed after the regional self-attention on the first set of tokens.

17. The system of claim 12, wherein analyzing the first set of tokens and the second set of tokens comprises performing a plurality of stages of regional-to-local self attention.

18. The system of claim 17, wherein, for at least a first stage of the plurality of stages, the respective regional-to-local self attention comprises performing a downsampling operation to (i) reduce a spatial resolution of the first set of tokens and the second set of tokens prior to a subsequent second stage of the plurality of stages and (ii) increase a channel dimension on the first set of tokens and the second set of tokens prior to the subsequent second stage.

19. The system of claim 12, wherein the at least one vision task comprises at least one of: (i) object detection, (ii) image classification, (iii) action recognition, or (iv) semantic segmentation.

20. A computer-readable storage medium having computer-readable program code embodied therewith, the computer-readable program code executable by one or more computer processors to perform an operation comprising:
- generating a first set of tokens based on a visual content item, wherein each token in the first set of tokens is associated with a regional feature from a different region of a plurality of regions of the visual content item;
- generating a second set of tokens based on the visual content item, wherein each token in the second set of tokens is associated with a local feature from one of the plurality of regions of the visual content item;
- generating at least one feature map for the visual content item, based on analyzing the first set of tokens and the second set of tokens separately using a hierarchical vision transformer; and
- performing at least one vision task based on the at least one feature map.

\* \* \* \* \*